(12) United States Patent
Zhang

(10) Patent No.: US 11,262,484 B2
(45) Date of Patent: Mar. 1, 2022

(54) MICRO-OPTICAL IMAGING FILM AND IMAGING DEVICE

(71) Applicant: SHINE OPTOELECTRONICS (KUNSHAN) CO., LTD, Kunshan (CN)

(72) Inventor: Jian Zhang, Kunshan (CN)

(73) Assignee: Shine Optoelectronics (Kunshan) Co., Ltd, Kunshan (CN)

( * ) Notice: Subject to any disclaimer, the term of this patent is extended or adjusted under 35 U.S.C. 154(b) by 244 days.

(21) Appl. No.: 15/952,684

(22) Filed: Apr. 13, 2018

(65) Prior Publication Data

US 2018/0231695 A1 Aug. 16, 2018

Related U.S. Application Data

(63) Continuation of application No. PCT/CN2016/102143, filed on Oct. 14, 2016.

(30) Foreign Application Priority Data

Oct. 14, 2015 (CN) .......................... 201510661376.1

(51) Int. Cl.
*G02B 3/00* (2006.01)
*B42D 25/425* (2014.01)
(Continued)

(52) U.S. Cl.
CPC ......... *G02B 3/0037* (2013.01); *B42D 25/324* (2014.10); *B42D 25/425* (2014.10);
(Continued)

(58) Field of Classification Search
CPC .. G02B 3/0006; G02B 3/0037; G02B 3/0043; G02B 3/005; G02B 3/0056;
(Continued)

(56) References Cited

U.S. PATENT DOCUMENTS 5,359,454 A * 10/1994 Steenblik .............. G03F 7/0035
359/463
6,680,762 B2 * 1/2004 Fukuda ............. G02F 1/133528
349/95
(Continued)

FOREIGN PATENT DOCUMENTS

CN 1677130 A 10/2005
CN 1906547 A 1/2007
(Continued)

OTHER PUBLICATIONS

English machine translation of CN-101767511-A. (Year: 2010).*
(Continued)

*Primary Examiner* — Nicholas R. Pasko
(74) *Attorney, Agent, or Firm* — Hamilton, Brook, Smith & Reynolds, P.C.

(57) ABSTRACT

This application relates to the technical field of optical films, and discloses a micro-optical imaging film and an imaging apparatus. The micro-optical imaging film includes a body; focusing structures and pattern structures being formed on the body, the focusing structures and pattern structures being adapted to each other, so as to form an image; and e cover structures covering exterior surfaces of at least part of the focusing structures, wherein materials of the cover structures and the focusing structures are different, and a difference between a refractive index of the cover structures and a refractive index of the focusing structures is greater than or equal to 0.05. With the technical solution contained in the embodiments of this application, a capability of the imaging film to resist ambient environmental pollutions may be improved.

8 Claims, 4 Drawing Sheets

(51) Int. Cl.
 *B42D 25/45* (2014.01)
 *B44F 1/04* (2006.01)
 *B42D 25/324* (2014.01)
 *B44F 1/08* (2006.01)
 *G02B 1/18* (2015.01)
 *B42D 25/342* (2014.01)
 *G02B 3/08* (2006.01)

(52) U.S. Cl.
 CPC ............... *B42D 25/45* (2014.10); *B44F 1/04* (2013.01); *B44F 1/08* (2013.01); *G02B 1/18* (2015.01); *B42D 25/342* (2014.10); *G02B 3/08* (2013.01)

(58) Field of Classification Search
 CPC ...... G02B 3/0075; G02B 27/06; G02B 27/60; G02B 30/27; G02B 30/56; B42D 25/00; B42D 25/342; B42D 2035/20
 USPC ........ 359/619, 620, 626, 454, 455, 462, 463
 See application file for complete search history.

(56) References Cited

U.S. PATENT DOCUMENTS

| | | | | |
|---|---|---|---|---|
| 6,831,787 | B1 * | 12/2004 | Scarbrough | G02B 3/005 359/622 |
| 7,866,559 | B2 * | 1/2011 | Bi | B42D 25/47 235/487 |
| 8,099,024 | B2 * | 1/2012 | Stelter | G02B 3/0012 399/231 |
| 8,310,760 | B2 * | 11/2012 | Steenblik | G02B 3/0031 359/619 |
| 8,685,488 | B2 * | 4/2014 | Hoffmuller | B41M 1/10 427/7 |
| 8,778,481 | B2 * | 7/2014 | Kaule | B42D 25/425 428/195.1 |
| 2008/0191463 | A1 * | 8/2008 | Vermeulen | G02B 3/08 283/110 |
| 2011/0027538 | A1 | 2/2011 | Hoffman et al. | |
| 2018/0149775 | A1 * | 5/2018 | Power | B42D 25/324 |

FOREIGN PATENT DOCUMENTS

| | | | |
|---|---|---|---|
| CN | 101434176 A | | 5/2009 |
| CN | 101767511 A | * | 7/2010 |
| CN | 101767511 A | | 7/2010 |
| CN | 104023991 A | | 9/2014 |
| CN | 104024921 A | | 9/2014 |
| CN | 205333897 U | | 6/2016 |
| CN | 205374781 U | | 7/2016 |
| WO | WO-2013139749 A1 * | 9/2013 | ............. B42D 25/45 |

OTHER PUBLICATIONS

English machine translation of WO-2013139749-A1. (Year: 2013).*
International Search Report for International Appl. No. PCT/CN2016/102143, entitled "Micro Optical-Imaging Film and Imaging Apparatus," consisting of 3 pages, dated Dec. 27, 2016.

* cited by examiner

MICRO-OPTICAL IMAGING FILM AND IMAGING DEVICE

CROSS REFERENCE TO RELATED APPLICATIONS

The above-captioned application is a Continuation of International Application No. PCT/CN2016/102143, which designated the United States and was filed on Oct. 14, 2016, published in Chinese, which claims priority to Chinese Application No. 201510661376.1, filed on Oct. 14, 2015. The entire teachings of the above applications are incorporated herein by reference.

FIELD

This disclosure relates to the technical field of optical films, and in particular to a micro-optical imaging film and an imaging device.

BACKGROUND ART

The Moire technique is a remarkable new-type visual security technique, which uses a focusing function of a microlens array to amplify a micro image with a high efficiency, thereby achieving a pattern having a certain depth of view and representing peculiar dynamic effects.

Patent document 200480040733.2 discloses a microlens array security element applied to a window opening security line of securities, such as a banknote. Its basic structure is: a periodic microlens array is arranged on the upper surface of the transparent base layer, and a corresponding periodic micro-pattern array is arranged on the lower surface of the transparent base layer, the micro-pattern array being located at or near a focal plane of the microlens array, and the arrangement of the micro-pattern array and the microlens array being substantially the same, and the micro-lens array acts on the Moire amplification of the micro-pattern array.

This patent discloses two methods of making a micro-pattern: a printing method of a group selected from a group consisting of ink jet, laser, relief printing, offset printing, gravure printing, and gravure printing, in which convex micro-patterned ink is provided on the lower surface of a transparent base layer; or depression of a pattern is formed on the lower surface of the transparent substrate, and the depression is filled with ink to form a micro-pattern. The latter has the advantage of an almost infinite spatial resolution. Therefore, providing the micro-lenses and the recessed micro-patterns on the upper and lower surfaces of the transparent base layer respectively has optimal graphic complexity and resolution, which helps maximize the imitation difficulty of the security device.

However, the current use of such security elements is mainly integrally embedding into paper or being bonded to a surface of a print. Hot foil stamping is a mainstream method of placing local security elements in a package of a product. However, the hot foil stamping technique requires that a security element should be very thin and cut off.

In the current industry, the minimum thickness of a transparent substrate with practical processing feasibility is 23 μm. Together with the thickness of microlenses and recessed structures, the overall thickness of the security element generally increases to more than 40 μm. Therefore, an overall structure of such a thickness is extremely unfavorable for timely cutting off at high-speed by hot foil stamping. In addition, the transparent substrate often has good mechanical properties, which is also not conducive to requirements of hot foil stamping for cutting.

In order to adapt the security element to the mainstream hot foil stamping method, the transparent substrate in the security element must be removed. Patent document 200480040733.2 discloses a tamper indicating material embodiment in FIGS. 13-14. That is, when the peelable layer covering the surface of the microlens is peeled, the effect of the amplification of the micro-pattern changes before and after the peeling. It is worth mentioning that, viewed from FIG. 14, it is a "peel change" film structure, which includes a peelable microlens, a second microlens, a first pattern layer, and a second pattern layer, the first pattern layer being able to be printed directly on the back of the second microlens. An optical spacer 244 is further provided between the first pattern layer and the second pattern layer. At this time, a transparent substrate is excluded between the second microlens and the first pattern layer, but at this time, the second microlens is unable to display an image of the first pattern layer (see the page 20, paragraph 2, of the description). Furthermore, pages 29-30 of the description of this patent disclose a structure preparation method in this patent, which basically includes the following steps: S01 one or more optical spacers; S02 microlenses and pattern layers are respectively located on the surface of the optical spacer. Wherein, the surface of the optical spacer is provided with a curable resin to prepare microlenses and a pattern layer.

In the implementation of this application, the inventors found that at least the following problems exist in the prior art:

the microlens structure of the imaging film in the prior art is often susceptible to contaminations from the outside environment (e.g. contamination with oil, water, gel, etc.), which may directly affect the imaging function of the imaging film.

SUMMARY OF THE INVENTION

Based on this, there is a need to provide a micro-optical imaging film and imaging device to improve an ability of the imaging film to resist environmental pollution.

An embodiment of this disclosure provides a micro-optical imaging film, including a body;

focusing structures and pattern structures being formed on the body, the focusing structures and pattern structures being adapted to each other, so as to form an image;

cover structures covering exterior surfaces of at least part of the focusing structures, wherein materials of the cover structures and materials of the focusing structures are different, a difference between a refractive index of the cover structures and a refractive index of the focusing structures is greater than or equal to 0.05.

In an embodiment, the focusing structures and the pattern structures are integral.

In an embodiment, first fusion portions are formed between first polymers forming the focusing structures and second polymers forming the pattern structures.

In an embodiment, a spacer structure is further formed on the body, the focusing structures and the pattern structures being located respectively at two sides of the spacer structure.

In an embodiment, the focusing structures and the spacer structure are integral.

In an embodiment, second fusion portions are formed between the first polymers forming the focusing structures and third polymers forming the spacer structure.

In an embodiment, the pattern structures and the spacer structure are integral.

In an embodiment, third fusion portions are formed between the second polymers forming the pattern structures and the third polymers forming the spacer structure.

In an embodiment, the focusing structures are formed on a first surface of the body, and the pattern structures are formed on a second surface of the body, the first surface and the second surface being opposite to each other.

In an embodiment, the focusing structures are formed on a first surface of the body, and the pattern structures are formed in the interior of the body.

In an embodiment, the pattern structures are groove structures.

In an embodiment, the focusing structures include one or more microlenses or Fresnel lenses.

In an embodiment, a surface of the cover structures away from the focusing structures is a flat surface.

An embodiment of this disclosure provides an imaging device, including:

an imaging film comprising focusing structures and pattern structures, the focusing structures and pattern structures being adapted to each other, so as to form an image;

cover structures used for covering exterior surfaces of at least part of the focusing structures, wherein materials of the cover structures and materials of the focusing structures are different, and a difference between a refractive index of the cover structures and a refractive index of the focusing structures is greater than or equal to 0.05; and a carrying structure located at a side of the cover structures away from the imaging film and used for carrying and displaying images of the imaging film.

In an embodiment, the focusing structures and the pattern structures are integral.

In an embodiment, first fusion portions are formed between first polymers forming the focusing structures and second polymers forming the pattern structures.

In an embodiment, the imaging film further includes a spacer structure, the focusing structures and the pattern structures being located respectively at two sides of the spacer structure.

In an embodiment, the focusing structures and the spacer structure are integral.

In an embodiment, second fusion portions are formed between the first polymers forming the focusing structures and third polymers forming the spacer structure.

In an embodiment, the pattern structures and the spacer structure are integral.

In an embodiment, third fusion portions are formed between the second polymers forming the pattern structures and the third polymers forming the spacer structure.

In an embodiment, the pattern structures are groove structures.

In an embodiment, the focusing structures include one or more microlenses or Fresnel lenses.

In an embodiment, a surface of the cover structures away from the focusing structures is a flat surface.

As can be seen from the technical solutions provided by the above embodiments of the present application, the embodiment of the present application provides a cover structure on the outer surface of the focusing structures, the cover structure covers at least part of the outer surface of the focusing structures, and a difference between the refractive index of the cover structure and the refractive index of the focusing structures is greater than or equal to 0.05, which may isolate the focusing structures from the outside, so that the contamination of the focusing structures by the external environment may be reduced, thereby achieving a goal of improving a capability of the imaging film to resist ambient environmental pollutions.

DETAILED DESCRIPTION OF THE INVENTION

Figure 1:
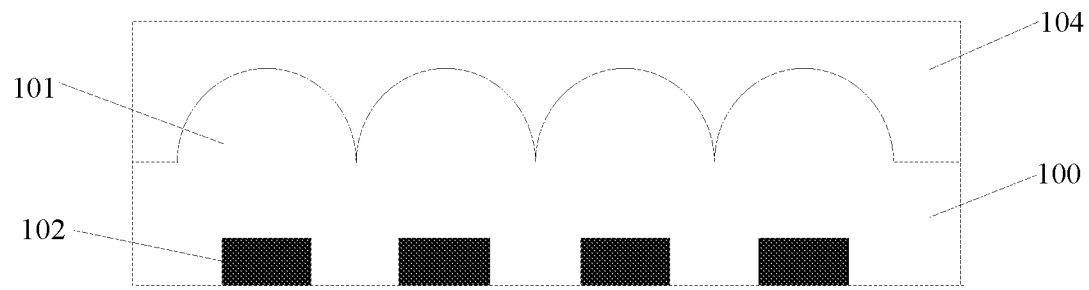
FIG. 1 is a schematic diagram of a structure of the micro-optical imaging film provided by an embodiment of this application.

For easy understanding of this disclosure, this disclosure shall be described more fully below with reference to the accompanying drawings. Preferred embodiments of this disclosure are given in the drawings. However, this disclosure may be carried out in many other ways, and are not limited to the embodiment described below. Rather, a target of these embodiments is to make this disclosure to be understood more completely. To be noted, when an element is described as being "disposed/provided" on another element, it may be located on another element directly, or there may be an intermediate element. When an element is described as being "connected to" another element, it may be connected to another element directly, or there may be an intermediate element. The terms "vertical", "horizontal", "upper", "lower", "left", "right", and the like used herein are just for the purpose of description, rather than indicating a unique embodiment.

Unless otherwise defined, all of the technical and scientific terms used herein are the same as those commonly understood by a person skilled in the technical field of the present disclosure. The terms used in the specification of the present application are just for the purpose of illustrating the specific embodiments, rather than limiting the present disclosure. The term "and/or" used herein includes any and all combinations of one or more related items listed.

An embodiment of this application provides a micro-optical imaging film, including a body; focusing structures and pattern structures being formed on the body, the focusing structures and pattern structures being adapted to each other, so as to form an image; and cover structures covering exterior surfaces of at least part of the focusing structures, wherein materials of the cover structures and materials of the focusing structures are different, and a difference between a refractive index of the cover structures and a refractive index of the focusing structures is greater than or equal to 0.05. Hence, the focusing structures may be made isolated from the outside environment, and imaging of the pattern structures is not affected, thereby reducing contaminations from the outside environment on the imaging film, so as to achieve a goal of improving a capability of the imaging film to resist ambient environmental pollutions.

Table 1 shows a relationship between the refractive index difference between the cover structure and the focusing structure and the thickness of the micro-optical imaging film. Wherein, for different refractive index differences, the aperture and the curvature of the focusing structure (e.g. microlenses) and the refractive index of the cover structure are all the same. As can be seen from the table below, the larger the difference between the refractive index of the cover structure and the refractive index of the focusing structure, the smaller the thickness of the micro-optical imaging film.

TABLE 1

Relationship between the refractive index difference between the cover structure and the focusing structure and the thickness of the micro-optical imaging film

| Refractive index difference | Aperture (μm) | Curvature (μm) | Refractive index of the cover structure | Thickness of the film (μm) |
| --- | --- | --- | --- | --- |
| 0.05 | 145 | 240 | 1.47 | 7045 |
| 0.1 | 145 | 240 | 1.47 | 3528 |
| 0.5 | 145 | 240 | 1.47 | 705 |
| 0.7 | 145 | 240 | 1.47 | 504 |

The micro-optical imaging film provided by the embodiment of this application shall be described below in detail with reference to the accompanying drawings.

The embodiment of the present application provides a micro-optical imaging film, as shown in FIG. 1. The imaging film includes a body 100 made from a polymer. Focusing structures 101 and pattern structures 102 adapted to each other are formed on the body 100. The pattern structures 102 image via the focusing structures 101. At least part of the outer surface of the focusing structures 101 are covered by cover structures 104 for isolating the focusing structures 101 from the outside, so as to reduce the pollution of the external environment on the focusing structures 101.

The polymer may be one type of polymer or two types of polymers. Each type of the polymer may be a single polymer, or may be a mixed polymer that is a mixture of multiple individual polymers that do not react. Light transmittance of the polymer may be greater than 70%, or the polymer may be of a transparent color or visually transparent. The polymer may be a resin, such as PET (polyethylene terephthalate), PVC (polyvinyl chloride), PC (polycarbonate), or PMMA (polymethyl methacrylate), and may also be a light-curing adhesive or a heat-curing adhesive, such as a UV-curable adhesive, and an OCA (Optically Clear Adhesive), etc.

If the polymer is one type of polymer, the focusing structures 101 and the pattern structures 102 may be respectively formed on the first surface and the second surface opposite to each other in the body, and may also be formed respectively on the first surface of the body and inside the body. At this time, the body 100 is a layer of polymer layer, in which the polymers may be evenly distributed or unevenly distributed. The focusing structures 101 and accommodation structures 103 (shown in FIG. 5) for forming the pattern structures 102 are formed on the same polymer layer, so there is no interface between the focusing structures 101 and the accommodation structures 103. That is, the focusing structures 101 and the pattern structures 102 are integral.

Figure 2:
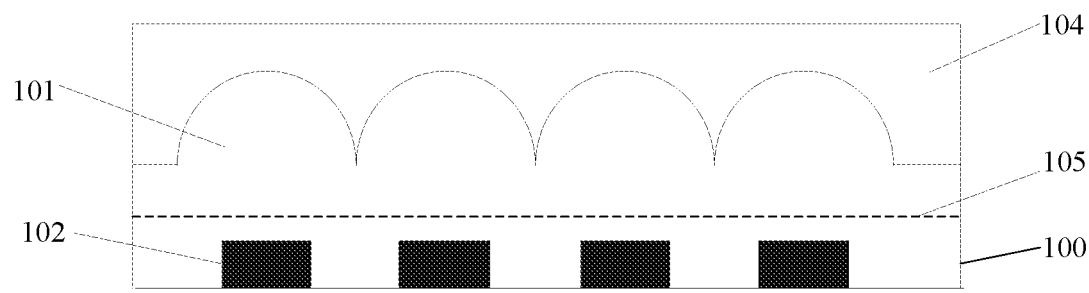
FIG. 2 is another schematic diagram of a structure of the micro-optical imaging film provided by the embodiment of this application.

If the polymer is two types of polymers, the focusing structures 101 may be formed on a first surface of a polymer (for example, a first polymer), and the pattern structures 102 may be formed on a second surface or interior of the other polymer (for example, a second polymer). First fusion portions 105 (shown in FIG. 2) are formed at neighboring portions between the two polymers. Therefore, the focusing structures 101 and the pattern structures 102 may be deemed as being integral. There is no interface between the focusing structures 101 and the accommodation structures 103 for forming the pattern structures 102, or on a cross section of the imaging film, there is no obvious layer-to-layer boundary between the focusing structures 101 and the accommodation structures 103, or an appeared boundary is regular and in order. The first fusion portions may be regions formed by fusing the two polymers at a preset ratio. The preset ratio may be N:M; in which, N and M are contents of the two polymers at the intersection of the neighboring portions of the focusing structures 101 and the pattern structures 102, and values thereof may be 0 to 100%, exclusive of 0 and 100%. It should be noted that a content of the first polymer in the focusing structures 101 is 100%, and a content of the second polymer in the pattern structures 102 is 100%. The neighboring portions may be contact portions between the two polymers when the two polymers are pressed with a die to form the focusing structures 101 and the pattern structures 102.

Figure 3:
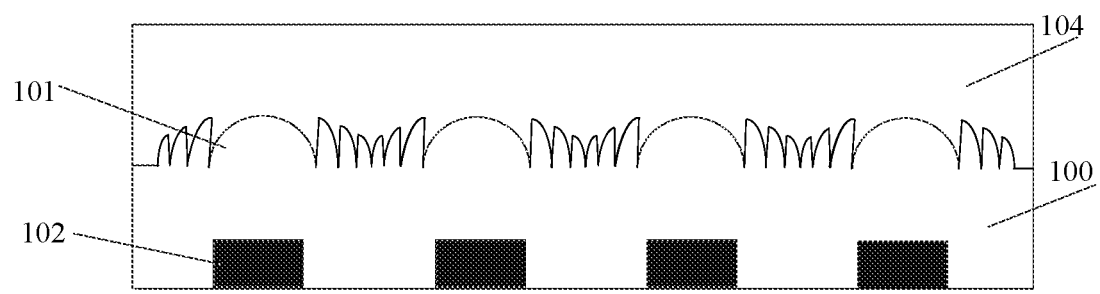
FIG. 3 is further schematic diagram of a structure of the micro-optical imaging film provided by the embodiment of this application.
Figure 4:
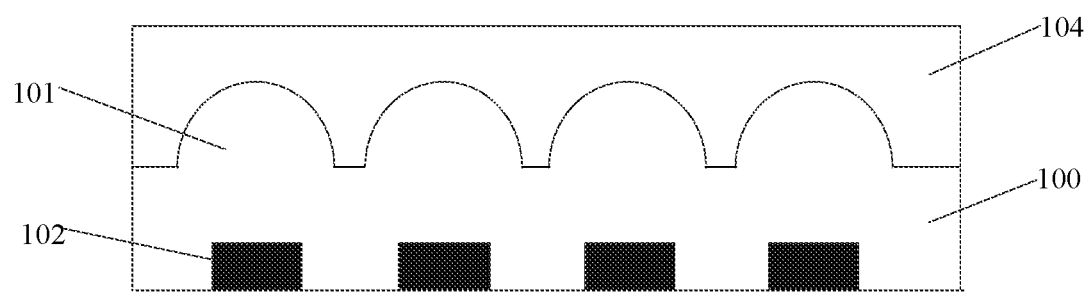
FIG. 4 is still another schematic diagram of a structure of the micro-optical imaging film provided by the embodiment of this application.

(1) The focusing structures 101 may be used for imaging the pattern structures, and may include one or more focusing units, the focusing units may be microlenses (as shown in FIG. 1), or Fresnel lenses (as shown in FIG. 3). There may be no gap between the multiple focusing units (as shown in FIG. 1), so as to reduce an overall volume of the imaging film. And a gap may also be between the multiple focusing units (as shown in FIG. 4), so that the integrity of cut focusing units may be ensured in cutting the imaging film, thereby ensuring subsequent imaging effects of the focusing units.

The focusing structures 101 may be formed on the first surface of the body 100, in particular, focusing units in the focusing structures 101 are formed on the first surface of the body 100.

(2) The pattern structures 102 may include one or more identical or different pattern units, which may be patterns or micro patterns (i.e. micron-level patterns), such as graphics, texts, numbers, grids, landscapes, and/or logos, etc., that are patterns easy to be identified. The different pattern units may be that sizes of the (micro-)patterns are different, or may be that shapes of the (micro-)patterns are different, or may be that constitutions of the (micro-)patterns are different. For example, a first (micro-)pattern is a name of a company, and a second (micro-)pattern is a company Logo. The pattern structures 102 image via the focusing structures 101, which may be understood as that the pattern units image via corresponding focusing units.

Figure 5:
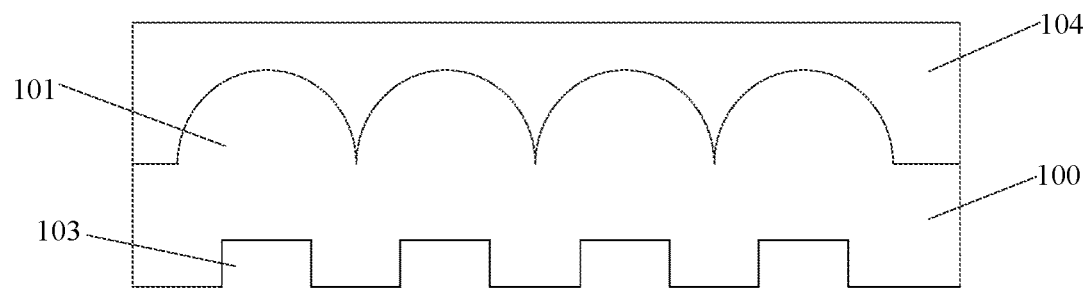
FIG. 5 is yet another schematic diagram of a structure of the micro-optical imaging film provided by the embodiment of this application.

(3) The pattern structures 102 may be formed by forming one or more accommodation structures 103 on the body, the accommodation structures being grooves or micro-grooves (i.e. micron-level grooves), as shown in FIG. 5, and then filling the accommodation structures 103 with a filler. The filler may be a material having a refractive index to light different from that of the polymer, including a coloring material, a dying material, a metal material, a conductive material, or the like, such as an ink. It should be noted that the color of the filler may be different from that of the polymer, so that when people observe the imaging of the pattern structures, patterns in the pattern structures may be clearly distinguished.

It should be noted that the pattern structures herein are not only limited to portions of the accommodation structures filled with the filler, and they may also include portions surrounding the accommodation structures.

Figure 6:
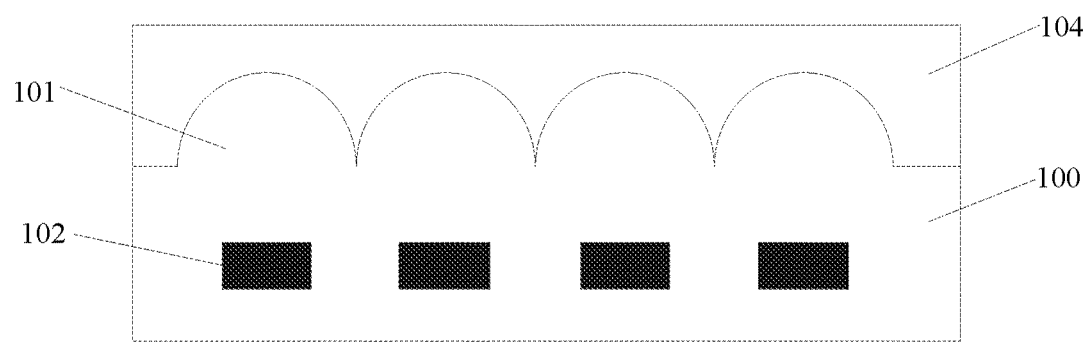
FIG. 6 is yet still another schematic diagram of a structure of the micro-optical imaging film provided by the embodiment of this application.

(4) The pattern structures 102 may be formed on the second surface of the body 100 away from the focusing structures 101, or may be formed inside the body, as shown in FIG. 6. For the structure shown in FIG. 6, the pattern structures may be formed by forming grooves in a surface of the polymer, then filling the polymer in the grooves, and finally coating surfaces of the pattern structures with the polymer. The pattern structures thus formed are located in the interior of the body, and since both sides of the pattern structures are polymers of the same type, the surfaces on which the pattern structures are located will disappear due to fusion of polymers, and no interface will be formed inside the body.

(5) The pattern structures 102 can be adapted to the focusing structures 101, which may be understood as that the pattern structures 102 may image via the focusing structures 101. The adaptation of the pattern structures 102 to the focusing structure 101 may include that the pattern structures 102 are adapted to locations of the focusing structures 101; for example, micro-patterns in the pattern structures 102 and the focusing units in the focusing structures 101 (such as microlenses) are arranged facing to each other, so as to increase utilization of polymer materials. The adaptation of the pattern structures 102 to the focusing structures 101 may also include corresponding setting of the focusing units in the focusing structures 101 and the pattern units in the pattern structures 103, which is advantageous to ensuring that each cut imaging film unit at least contains an integral focusing unit and graphic and text unit when the imaging film is cut.

(6) The pattern structures 102 may be located near a focal plane of the focusing structures 101, and may image via the focusing structures 101, and amplified images of the pattern structures 102 may be observed at a side of the focusing structures 101 opposite to the pattern structures 102. In particular, it may be that each micro pattern in the pattern structures 102 is located near a corresponding focal plane in the focusing structures 101, and each micro pattern may image via a corresponding focusing unit, and an amplified image corresponding to the micro pattern may be observed at the other side of each micro pattern. The focal plane may denote a plane passing the focal point of the focusing unit and perpendicular to a main optical axis of the focusing unit.

(7) A distance between a top of the focusing structures 101 and a top of the pattern structures 102 may be 2~150 microns. When distances between the focusing structures and the pattern structures are very small, it may be understood that the pattern structures are embedded in the microlens structure. The smaller the distances between the focusing structure and the pattern structures, the smaller the thickness of the imaging film, which not only saves costs, but also makes it easier to cut off during hot foil stamping.

(8) The cover structures 104 may be used to partially or wholly cover the exterior surfaces of the focusing structures 101, so as to isolate the focusing structures 101 from the outside and avoid being polluted by the external environment. The cover structures 104 may directly cover a surface of the focusing structures 101 away from the pattern structures 102, and a surface thereof away from the focusing structures 101 may be a flat surface, which may be advantageous to improving subsequent experiences of a user. The material used for forming the cover structures 104 is different from the material used for forming the focusing structures 101, and a difference between refractive indices of them is different. A preferred refractive index difference may be greater than or equal to 0.05 and light transmittance thereof is not less than 70%. After repeated experiments by the inventor, it was proved that when the difference in refractive index between the two is greater than or equal to 0.05, the imaging film may be better used in practical applications, and imaging of the text and text structures 102 may be observed outside the cover structures 104, thereby not affecting the imaging effect of the imaging film.

(9) The cover structures 104 partially covering the outer surface of the focusing structures 101 may refer to that the covering structures 102 may cover the entire exterior surfaces of a part of the focusing units in the focusing structures 101 and isolate the focusing units from the outside, rather than covering a part of the exterior surfaces of one or more focusing units. The cover structures 104 wholly covering the exterior surfaces of the focusing structures 101 may refer to that the covering structures 102 may completely cover all the exterior surfaces of all the focusing units in the focusing structures 101, and completely isolate the focusing structures 101 from the outside. At this moment, the focusing structures 101 and the cover structures 102 may be viewed as forming a closed space, as shown in FIG. 1.

(10) It can be seen from the above description that the embodiment of the present application provides the cover structures are provided on the exterior surfaces of the focusing structures, which may isolate the focusing structures from the outside, so that the contamination on the focusing structures from the external environment may be reduced, thereby achieving a goal of improving a capability of the imaging film to resist ambient environmental pollutions. In addition, the focusing structures and the pattern structures in the embodiment of the present application are integral without a substrate layer, which may reduce the thickness of the imaging film, and the imaging film has poor mechanical properties, which makes the imaging film easily to be cut off in hot foil stamping.

The thickness of the image forming film in the embodiments of the present application is small, which may reach decades of micrometers, or even several micrometers, and the imaging film is easily cut. Therefore, the imaging film may easily be transferred, the weight may be reduced and the cost may be saved.

Figure 7:
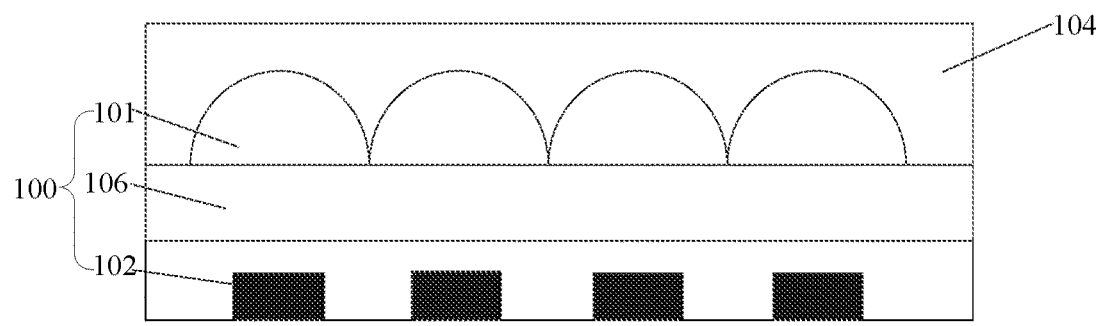
FIG. 7 is a schematic diagram of a structure of another micro-optical imaging film provided by an embodiment of this application.

In another embodiment, a spacer structure 106 is further formed in the body. As shown in FIG. 7, the focusing structures 101 and the pattern structures 102 are located respectively at two sides of the spacer structure 106, such as being located on a third surface and a fourth surface in the spacer structure 106 opposite to each other.

(11) The spacer structures 106 may be used to adjust the distances between the focusing structures 101 and the pattern structures 102, that is, to adjust focal lengths of the focusing structures 101. The spacer structures 106 may also be resin, such as PET (polyethylene terephthalate), PVC (polyvinyl chloride), PC (polycarbonate), or PMMA (polymethyl methacrylate), or may be a light-curing adhesive or a heat-curing adhesive, such as a UV (ultraviolet rays) adhesive, an OCA (optically clear adhesive), or the like. Light transmittance of the spacer structures 106 may be more than 70%.

Figure 8:
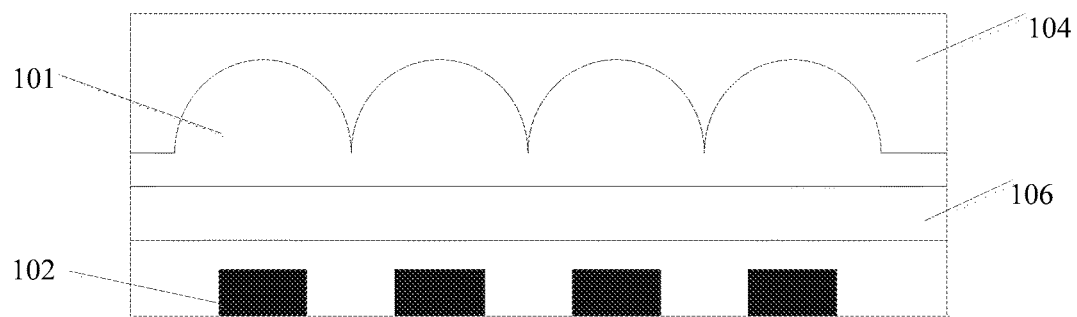
FIG. 8 is another schematic diagram of a structure of the micro-optical imaging film provided by the embodiment of this application.
Figure 9:
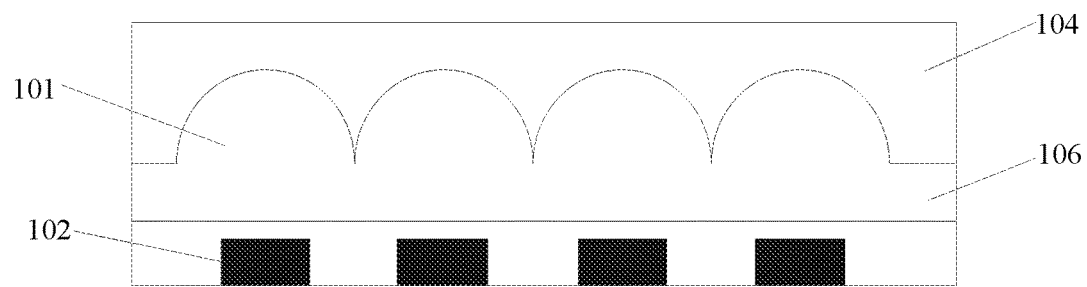
FIG. 9 is further schematic diagram of a structure of the micro-optical imaging film provided by the embodiment of this application.

(12) The focusing units in the focusing structures 101 may be directly adhered to a surface (for example, the third surface) of the spacer structures 106 (as shown in FIG. 7), and at this time, end surfaces of the focusing units are in direct contact with the third surface. The focusing units may also be formed on a surface of the focusing structures 101 which is away from the third surface but a normal direction of which is identical that of the third surface, and at this moment, there is certain distances between the focusing units and the third surface, and the end portions of which do not directly contact with the third surface (as shown in FIG. 8); it may further includes that the focusing units are formed directly on the third surface of the spacer structures 106 (as shown in FIG. 9), and at this moment, the focusing structures 101 and the spacer structures 106 form an integral structure, and the third surface is coincident with the first surface of the body 100, that is, they are the same surface.

Figure 10:
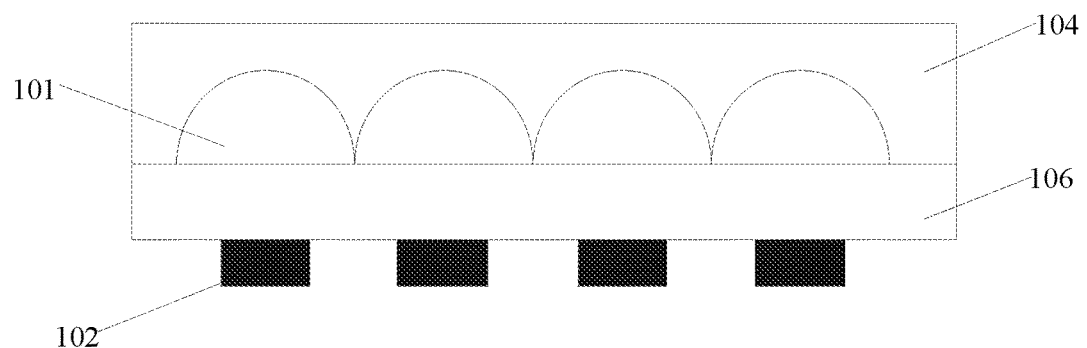
FIG. 10 is still another schematic diagram of a structure of the micro-optical imaging film provided by the embodiment of this application.
Figure 11:
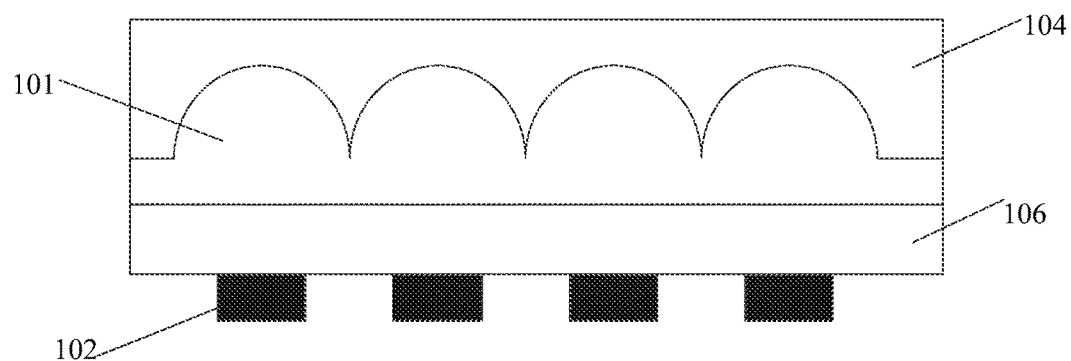
FIG. 11 is yet another schematic diagram of a structure of the micro-optical imaging film provided by the embodiment of this application.
Figure 12:
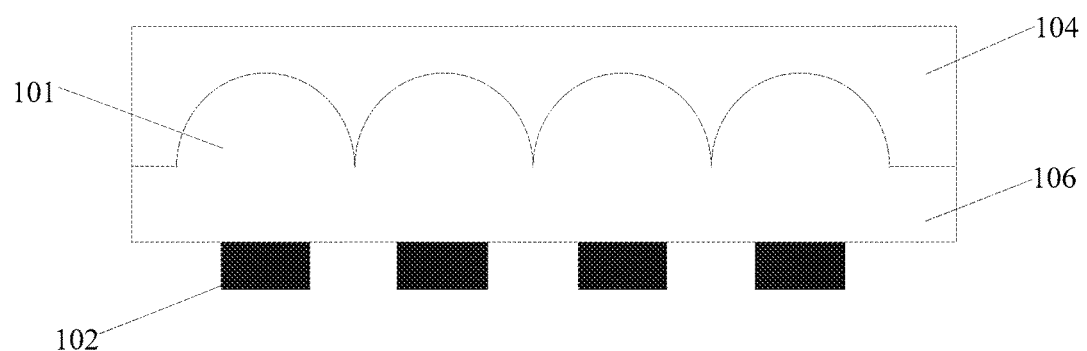
FIG. 12 is yet still another schematic diagram of a structure of the micro-optical imaging film provided by the embodiment of this application.
Figure 13:
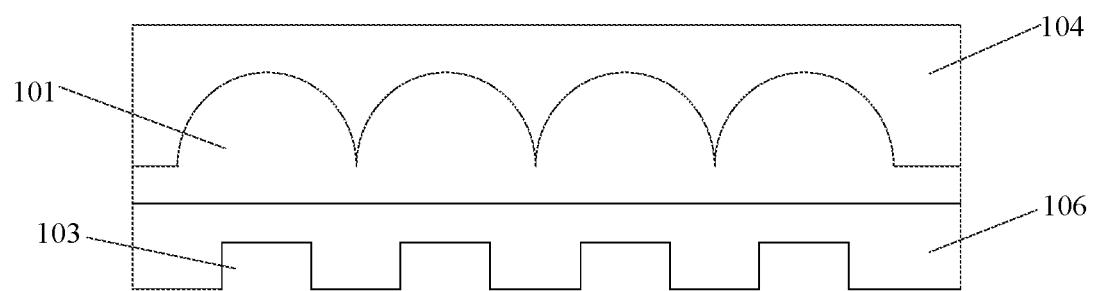
FIG. 13 is a yet further schematic diagram of a structure of the micro-optical imaging film provided by the embodiment of this application.

(13) The pattern structures 102 are located on the fourth surface of the spacer structures 106, which may be that the pattern structures 102 are directly adhered to the fourth surface of the spacer structures 106, that is, the pattern units are adhered to the fourth surface of the spacer structures 106, and at this moment, the pattern units may be of convex structures (as shown in FIGS. 10-12); and it may also be that the pattern units are formed directly on the fourth surface of the spacer structures 106, and at this moment, the pattern structures 102 and the spacer structures 106 form an integral structure. At this moment, groove structures 103 may be formed on the fourth surface, and as shown in FIG. 13, the groove structures 103 are used for a filler to be filled to form the pattern units. At this moment, the fourth surface coincides with the second surface of the body 100, that is, they are the same surface. And depths of the groove structures are less than or equal to those of the pattern structures 102.

(14) In a preparation process, after the spacer structures 106 may be prepared, the focusing structures 101 and the pattern structures 102 are respectively prepared on the third surface and the fourth surface of the spacer structures 106; and it may also be that the focusing structures 101 or the pattern structures 102 are prepared on the body first, and then the spacer structures 106 are prepared on a surface thereof. For both of the two cases, there exist interfaces between the focusing structures 101, the pattern structures 102 and the spacer structures 106 when the polymers forming the focusing structures 101 and the pattern structures 102 are different from the polymers forming the spacer structures 106.

(15) In the preparation process, it may also be that the focusing structures 101 and the spacer structures 106 are respectively formed on two surfaces of the same type of polymers opposite to each other; or it may be that second fusion portions are formed between neighboring portions of two types of polymers (such as the first polymers and the third polymers), or two types of polymers having second fusion portions between neighboring portions are used, and then the focusing structures 101 and the spacer structures 106 are respectively formed on two surfaces of the two types of polymers opposite to each other; such as forming the focusing structures 101 on the first surface of the first polymers, and forming the spacer structures 106 on the surface of the third polymers away from the first surface. For both of the two cases, the focusing structures 101 and the spacer structures 106 are integral. That is, there is no interface between the focusing structures 101 and the spacer structures 106. After the focusing structures 101 and the spacer structures 106 are formed, the pattern structures 102 are formed on the fourth surface of the spacer structures 106.

(16) In the preparation process, the groove structures and the spacer structures 106 may also be respectively formed on the opposite two surfaces of the same polymer, and the filler is filled in the groove structures, so as to form the pattern structures 102; it may also be that third fusion portions are formed between neighboring portions of two types of polymers (such as the second polymers and the third polymers), or two types of polymers having third fusion portions between neighboring portions are used, and then the groove structures and the spacer structures 106 are formed on opposite two surfaces of the two types of polymers, such as forming the groove structures on the second surface of the second polymers, and forming the spacer structures 106 on the second surface of the third polymers, and filling the filler in the groove structures, so as to form the pattern structures 102. For both of the two cases, there is no interface between the groove structures and the spacer structures 106. That is, the pattern structures 102 and the spacer structures 106 are integral. After the pattern structures 102 and the spacer structures 106 are formed, the focusing structures 101 are formed on the third surface of the spacer structures 106.

For a detailed description of the second fusion portions and the third fusion portions, reference may be made to the above-mentioned first fusion portions, which shall not be described herein any further.

It should be noted that the polymers used to form the focusing structures 101, the pattern structures 102, and the spacer structures 106 may be identical or different.

Figure 14:
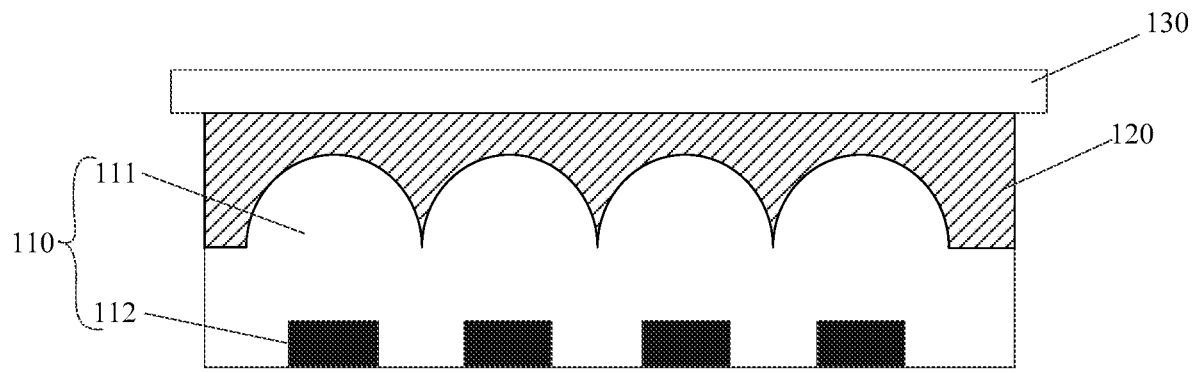
FIG. 14 is a schematic diagram of a structure of the device containing a micro-optical imaging film provided by an embodiment of this application.

(17) An embodiment of the present application further provides an imaging device, as shown in FIG. 14. The imaging device comprises an imaging film 110, cover structures 120, and a carrying structure 130. In which, the imaging film 110 and the carrying structure 130 are located on two sides of the cover structures 120 respectively. One side of the cover structure 120 is attached to the imaging film 110, and the other side opposite to the side is attached with the carrying structure 130. The imaging film 110 may include focusing structures 111 and pattern structures 112, and may also include spacer structures (not shown in FIG. 14). The cover structures 120 may be used to connect the imaging film 110 and the carrying structure 130, and may cover exterior surfaces of at least part of the focusing structures 111 in the imaging film 110 to isolate the focusing structures 111 from the outside and prevent the focusing structures 111 from being exposed to the external environment pollution. FIG. 14 shows a case where the cover structures 120 completely cover the exterior surfaces of the focusing structures 111. A polymer used to form the cover structures 120 may be a glue that is different from a polymer forming the focusing structures 111. A refractive index difference between the cover structures 120 and the focusing structures 111 may be greater than or equal to 0.05, and its light transmittance may be greater than 70%. The carrying structure 130 may be used to carry the imaging film 110, which may be in a solid state that is transparent at a room temperature, and may be, for example, a glass. In this way, an image of the imaging film may be observed from a side of the carrying structure 130 away from the cover structures 120.

For detailed description of the focusing structures, the pattern structures, and the spacer structures, reference may be made to the related description of the corresponding embodiment in FIG. 1-10, which shall not be described herein any further.

It can be seen from the above description that the imaging device provided by the embodiment of the present application connects the imaging film and the carrying structure by providing the cover structures on the exterior surfaces of the focusing structures in the imaging film, and isolates the imaging film from the outside. This may prevent the imaging film from being contaminated by the external environment, thereby achieving a goal of improving a capability of the imaging film to resist ambient environmental pollutions.

Any numerical value cited herein includes all values of lower and upper values that increment in one unit from a lower limit to an upper limit and there is an interval of at least two units between any lower value and any higher value. For example, if it is stated that a number or process variable (e.g., temperature, pressure, time, etc.) of one member has a value from 1 to 90, preferably from 20 to 80, more preferably from 30 to 70, it has an objective to demonstrate that the Description also explicitly enumerates values such as 15 to 85, 22 to 68, 43 to 51, 30 to 32, and the like. For values less than 1, it is appropriate to consider one unit as 0.0001, 0.001, 0.01, 0.1. These are examples that are only intended to be expressly stated, and all possible combinations of numerical values enumerated between the lowest value and the highest value are explicitly set forth in this Description in a similar manner.

Unless otherwise indicated, all the ranges include endpoints and all numbers between endpoints. A wording "approximately" or "approximate" used with a range is suitable for both endpoints of the range. Thus, "approximately 20 to 30" is intended to cover "about 20 to about 30", at least including the indicated endpoints.

All disclosed articles and references, including patent applications and publications, are hereby incorporated by reference for all purposes. The term "consisting essentially of" to describe a combination shall include the element, ingredient, component or step that is being determined and other elements, ingredients, components or steps that do not essentially affect basic novel characteristics of the combination. Use of the term "comprising" or "including" to describe a combination of elements, ingredients, components or steps herein also contemplates embodiments that are substantially composed of those elements, ingredients, components or steps. Any property described to demonstrate that a term "may" includes is selectable by use of the term "may" herein.

A plurality of elements, ingredients, components or steps can be provided by a single integrated element, ingredient, component or step. Alternatively, the single integrated element, ingredient, component, or step may be divided into a plurality of separated elements, ingredients, components, or steps. The disclosure of "a" or "an" to describe an element, an ingredient, a component, or a step is not intended to exclude other elements, ingredients, components, or steps.

The embodiments in this description are described in a progressive manner, the same or similar parts among these embodiments may be referred to each other, and each embodiment focuses on the difference from other embodiments.

In order that the above objects, features and benefits of this disclosure to be more clear and easy to be understood, particular embodiments of this disclosure are described above in detail with reference to the accompanying drawings. Many details are given in the above description, so that this disclosure is fully understood. However, this disclosure may be carried out in many other ways than those described above, and similar modifications may be made by those skilled in the art without departing from the spirits of this disclosure, hence, this disclosure is not limited to the particular embodiments disclosed above. And furthermore, various technical features of the above embodiments may be arbitrarily combined. For the sake of simplicity of description, not all possible combinations of the various technical features of the above embodiments are described; however, combinations of these technical features should be deemed as being within the scope of this description only if there exists no contradiction therebetween.

The above embodiments only express some implementations of this disclosure, and their description is particular and in detail; however, it should be understood that they are not intended to limit the protection scope of the disclosure. It should be noted that any modifications, improvements and the like may be made by those skilled in the art within the spirits and principle of this disclosure. Therefore, the protection scope of the disclosure should be defined by the appended claims.

The invention claimed is:

1. A micro-optical imaging film, wherein the micro-optical imaging film comprises:
  a body comprised of a first portion and a second portion, wherein the first portion is made from a first polymer and the second portion is made from a second polymer which is different from the first polymer;
  focusing structures being formed on the first portion of the body and pattern structures being formed in the second portion of the body, the focusing structures being formed of the first polymer, the focusing structures and the pattern structures being adapted to each other, and the pattern structures imaging via the focusing structures;
  wherein the pattern structures are groove structures filled with a filler, wherein the groove structures are formed in the interior of the second portion of the body and the filler is a material having a refractive index to light different from that of the second polymer, wherein the groove structures are formed of the second polymer;
  wherein the filler is entirely located in the interior of the second portion of the body, so that all the surfaces of the filler are surrounded by the second polymer from which the second portion of the body is made;
  wherein a first fusion portion at an intersection of the first portion and the second portion away from the focusing structures and the pattern structures is formed by fusing the first polymer and the second polymer at a first preset ratio, so that there is no interface between the focusing structures and the pattern structures;
  the first preset ratio is N:M, in which, N and M are contents of the first polymer and the second polymer at the intersection of the first portion and the second portion, and values thereof is 0 to 100%, exclusive of 0 and 100%;

a distance between a top of the focusing structures and a top of the pattern structures is 2~150 microns;

cover structures covering exterior surfaces of at least part of the focusing structures, wherein materials of the cover structures and materials of the focusing structures are different, and a difference between a refractive index of the cover structures and a refractive index of the focusing structures is greater than or equal to 0.05.

2. The imaging film according to claim 1, wherein the focusing structures and the pattern structures are integral.

3. The imaging film according to claim 1, wherein the focusing structures are formed on a first surface of the first portion of the body.

4. The imaging film according to claim 1, wherein the focusing structures comprise one or more microlenses, the focusing structures and the pattern structures being adapted to each other, so as to form an image.

5. The imaging film according to claim 1, wherein the cover structures include first and second surface opposite each other in thickness, the first surface is provided on an exterior surface of the focusing structures, the second surface is flat.

6. The imaging film according to claim 1, wherein the pattern structures are formed by forming grooves in a surface of the second portion of the body which is made from the second polymer, filling with a filler in the grooves and coating the surface of the second portion of the body with the second polymer, so that the filler is entirely located in the interior of the second portion of the body.

7. An imaging device, wherein the imaging device comprises:

an imaging film comprising a body comprised of a first portion and a second portion, wherein the first portion is made from a first polymer and the second portion is made from a second polymer which is different from the first polymer;

focusing structures being formed on the first portion of the body and pattern structures being formed in the second portion of the body, the focusing structures being formed of the first polymer, the focusing structures and the pattern structures being adapted to each other, and the pattern structures imaging via the focusing structures;

wherein the pattern structures are groove structures filled with a filler, wherein the groove structures are formed in the interior of the second portion of the body and the filler is a material having a refractive index to light different from that of the second polymer, wherein the groove structures are formed of the second polymer;

wherein the filler is entirely located in the interior of the second portion of the body, so that all the surfaces of the filler are surrounded by the second polymer from which the second portion of the body is made;

wherein a first fusion portion at an intersection of the first portion and the second portion away from the focusing structures and the pattern structures is formed by fusing the first polymer and the second polymer at a first preset ratio, so that there is no interface between the focusing structures and the pattern structures;

the first preset ratio is N:M, in which, N and M are contents of the first polymer and the second polymer at the intersection of the first portion and the second portion, and values thereof is 0 to 100%, exclusive of 0 and 100%;

a distance between a top of the focusing structures and a top of the pattern structures is 2~150 microns;

cover structures-covering exterior surfaces of at least part of the focusing structures, the cover structures include first surface and second surface opposite each other in thickness, the first surface is provided on an exterior surface of the focusing structures, the second surface is flat, wherein materials of the cover structures and materials of the focusing structures are different, and a difference between a refractive index of the cover structures and a refractive index of the focusing structures is greater than or equal to 0.05;

a carrying structure used for displaying images of the imaging film, the carrying structure is provided on the second surface of cover structures, wherein the carrying structure is a solid in a transparent state.

8. The imaging film according to claim 7, wherein the pattern structures are formed by forming grooves in a surface of the second portion of the body which is made from the second polymer, filling with a filler in the grooves and coating the surface of the second portion of the body with the second polymer, so that the filler is entirely located in the interior of the second portion of the body.

* * * * *